Figure 1:
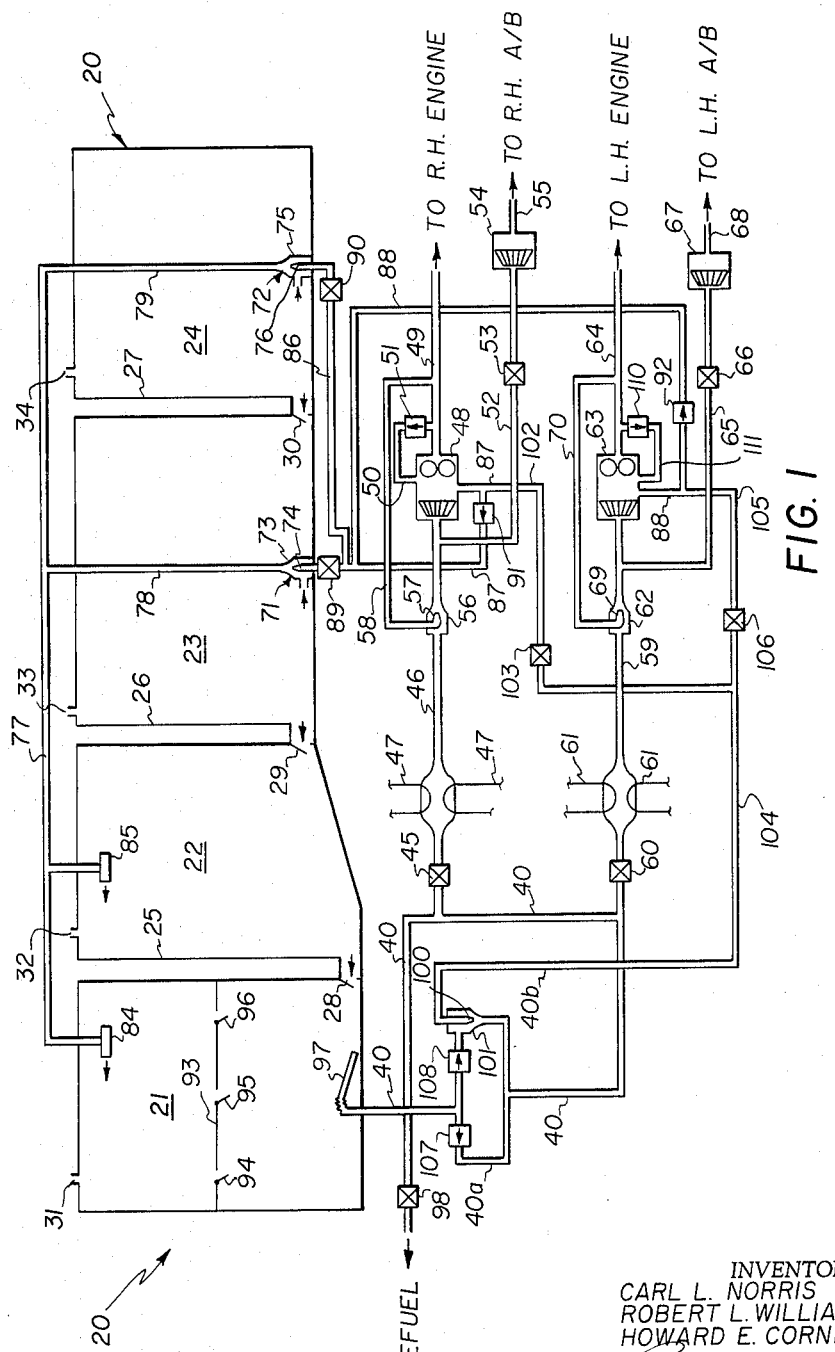

INVENTORS
CARL L. NORRIS
ROBERT L. WILLIAMS
HOWARD E. CORNER

ATTORNEY

INVENTORS
CARL L. NORRIS
ROBERT L. WILLIAMS
HOWARD E. CORNER

ATTORNEY

United States Patent Office 3,259,066
Patented July 5, 1966

3,259,066
FUEL FEEDING SYSTEMS
Robert L. Williams, 2027 Brentwood, Wichita, Kans.;
Howard E. Corner, 102 S. Robin Road, Wichita, Kans.;
and Carl L. Norris, 3606 Dawnwood Drive, Huntsville, Ala.
Filed Jan. 2, 1964, Ser. No. 335,219
13 Claims. (Cl. 103—5)

This invention relates to fuel feeding systems, and more particularly relates to fuel feeding systems for aircraft.

Conventional aircraft fuel feeding systems have heretofore utilized one or more electrical transfer pumps for transferring fuel between tanks and/or hydraulic transfer pumps for also transferring fuel between tanks or other various locations. Moreover, electrical boost pumps of the centrifugal type are used to supply fuel to aircraft engine driven fuel pump means. An engine driven fuel pump usually has two stages, the first stage being of a centrifugal type and the second stage being of a positive displacement type. The tank-mounted electrical boost pump is required to prevent engine failure due to fuel cavitation at altitude. The fuel boost pump must have the capacity to maintain positive pressure in the engine driven pump inlet during all flight conditions of the aircraft and for all engine throttle settings.

The operation of an impeller of a centrifugal pump, such as is usually used as a tank-mounted fuel boost pump, is characterized by high impeller tip speeds. High impeller tip speeds cause localized areas of low static pressure which can become so low as to permit the vaporization of a liquid, such as highly volatile jet fuel. This vaporization phase causes fluctuations in pump performance which in turn reduces fuel output pressure. This phenomenon is usually termed cavitation. If pump cavitation is to be prevented, tank pressure must be high, or alternatively additional power is required for driving the pump. Accordingly, there is a deterioration of boost pump performance with an increase in fuel temperature and/or altitude.

Most large or high performance aircraft presently use centrifugal pumping systems for engine fuel feed and transfer purpose. A principal type of centrifugal pumping system employs electrical motor driven pumps powered with electricity from a constant speed alternator or a D.C. generator. Other systems utilize hydraulic pumps or pneumatic turbine driven pumps. These systems have a history of malfunction and excessive maintenance and therefore cannot achieve a high degree of mission reliability. Accordingly, aircraft utilizing these systems must have dual systems. This often results in use of a combination of different types of centrifugal pumping systems, which require an excessive amount of secondary power.

This invention contemplates the use of ejector pumps in a fuel feeding system for replacing electrical transfer pumps, hydraulic transfer pumps, and electrical boost pumps ordinarily located within the fuel tank means. Ejector pumps offer the advantages of reducing the number of moving parts in a fuel feeding system by the elimination of centrifugal boost pumps as well as electrical and hydraulic transfer pumps, thereby providing a major improvement in aircraft fuel feeding systems. The ejector pumps require no wiring, cockpit controls, or circuit breakers, and accordingly eliminate the usual fire hazards associated with electrical pumps which are usually located within fuel tank means. Moreover, since an ejector boost pump depends upon an engine driven pump for operation and the engine also depends upon the engine driven pump for operation, there is no necessity for an auxiliary electrical system for driving electrical pumps from an external power supply. This lends simplicity and reliability to the invention.

Ejector pumps do not have moving parts that wear out nor do they have lubrication or overheat problems generally associated with electrically driven pumps, particularly of the centrifugal type, and therefore do not require the maintenance procedures associated with electrically driven or centrifugal pumps.

Ejector pump performance increases with altitude since fuel flow required by an engine is reduced by an increase in altitude due to decrease in engine power. Accordingly more fuel is made available as feedback for operating the ejector boost pump. In contradistinction thereto, the outputs of centrifugal boost pumps decay with altitude because ambient pressure is reduced with an increase in altitude. Accordingly, the fuel boost pressure rises required by the engine pump become greater in order to sustain the maximum pump inlet pressure of the centrifugal boost pump.

Normally, the fuel required by an engine driven pump for supplying fuel to an engine is essentially constant for a given engine speed regardless of altitude. Thus at an altitude where the engine demands less fuel flow, the excess power necessary for pumping is converted into heat. In a system utilizing an ejector boost pump this fuel is used for pumping and therefore is not completely converted into heat. However, this excess power is not utilized in a centrifugal boost pump system. Also additional power is required for the boost pumps. The ejector system therefore is more efficient since no additional power is required for fuel boost purposes. The ejector system is less costly because of its simplicity. Moreover, experience has demonstrated that there is a saving of weight.

It is an object of this invention therefore, to provide novel aircraft fuel feeding systems and subsystems employing ejector pumps with all of the attendant advantages pointed out hereinabove through the elimination of hydraulically or electrically driven boost or transfer pumps that may be of either a variable or a positive displacement type.

It is another object of this invention to provide novel aircraft fuel feeding systems or subsystems employing ejector boost pumps in combination with a fuel feeding pump that may be driven by an aircraft engine.

Another object of this invention is the provision of novel aircraft fuel feeding systems or subsystems utilizing ejector boost pumps, and/or ejector transfer pumps, operated by excess capacity of a main fuel pump that may be driven by an engine.

A still further object of this invention is the provision of novel aircraft fuel feeding systems or subsystems utilizing ejector pumps for engine fuel feeding and intertank transfer purposes, having many advantages over conventional pumping systems through the reduction of maintenance, secondary power requirements, or cost, and/or by improved reliability and safety.

The invention further resides in certain novel features of construction, combinations, and arrangements of parts, and further objects and advantages of the invention will be apparent to those skilled in the art to which it pertains from the following description of the present preferred embodiments thereof described with reference to the accompanying drawings which form a part of this specification, wherein the same reference numerals indicate corresponding parts throughout the several views, and in which:

FIG. 1 is a schematic diagram of a fuel storage, transfer, and feeding system embodying the invention for a high performance aircraft preferably having two engines with afterburners; and FIGS. 2 through 6 are schematic diagrams of fuel feeding subsystems embodying modifications of the invention.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, reference numeral 20 indicates generally an aircraft fuel tank system comprising main tanks 21 and 22 and auxiliary tanks 23 and 24. The tanks 21, 22, 23, 24 are each separated by sealed partitions 25, 26, and 27 that are each respectively provided with flap valves 28, 29, and 30. The valves 28, 29 and 30 permit the flow of fuel in one direction only from the auxiliary tank 24 into the auxiliary tank 23, from the auxiliary tank 23 into the main tank 22, and from the main tank 22 into the main tank 21. The tanks 21, 22, 23 and 24 are each provided with vents 31, 32, 33, and 34, respectively, to the atmosphere or a regulated pressure source. The main tank 21 supplies fuel to left hand and right hand engines, not shown, via a main fuel line 40 having parallel fuel line segments 40a and 40b. The fuel is fed through the main line 40 to a right hand engine, a right hand afterburner, a left hand engine, and a left hand afterburner, not shown. More particularly, the fuel is drawn through the main line 40 past a shut-off valve 45 into a pump intake line 46 having hydraulic system cooler elements 47 therein. The line 46 is connected to the inlet of a two stage fuel pump 48. The pump 48 discharges fuel via a discharge line 49 to the burners of the right hand engine, not shown. Pump 48 has a variable displacement, centrifugal first stage with an exit pressure of preferably approximately 100 p.s.i.g. and a positive displacement, gear pump second stage with an exit pressure of preferably approximately 1000 p.s.i.g. The second stage of the pump 48 has a pressure relief line 50 with a one-way, pressure relief check valve 51 therein. Fuel is supplied to the right hand afterburner via intake line 52 supplied with fuel from the main fuel line 46 on the intake side of the two stage pump 48. The line 52 has a shut-off valve 53 therein for regulating the fuel to be drawn through the line to an afterburner boost pump 54 of the centrifugal single stage type. The pump 54 discharges to the afterburner via a discharge line 55. Pressure in the intake line 46 is boosted by an ejector boost pump comprising an eductor 56 and a nozzle 57. A fuel conducting feedback line 58 has its ends connected to the pump discharge line 49 and to the ejector nozzle 57.

The main line 40 also conducts fuel to the left hand engine and the left hand afterburner via line 59, a shut-off valve 60, system cooler elements 61, an ejector pump eductor 62, a two stage engine driven pump 63, and a pump discharge line 64 to the left hand engine. The fuel pump 63 is similar to the fuel pump 48.

The left hand afterburner receives fuel from the line 59 via an afterburner pump intake line 65 having a shut-off valve 66 therein, a single-stage centrifugal afterburner boost pump 67, and a pump discharge line 68. The fuel feeding system for the right hand engine and its afterburner is substantially the same as the parallel system for the left hand engine and its afterburner. Pressure in the intake line 59 is boosted by an ejector boost pump comprising the eductor 62 and a nozzle 69. A feedback line 70 connects the pump discharge line 64 to the nozzle 69.

The main tanks 21 and 22, respectively, have fuel transferred thereto from the auxiliary tanks 23 and 24 by transfer pumps, respectively indicated generally by reference numerals 71 and 72. The pumps 71 and 72 are ejector boost pumps. The pump 71 comprises an eductor 73 and a nozzle 74 in the tank 23. The pump 72 comprises an eductor 75 and a nozzle 76 in the tank 24. Each of these pumps 71 and 72 discharge fuel into the main tanks 21 and 22 from a main line 77, respectively, via lines 78 and 79. The main tanks 21 and 22 receive the fluid from the main fuel transfer line 77 via fuel level shut-off valves 84 and 85, respectively.

The nozzles 74 and 76 of the ejector pumps 71 and 72 are connected to the first stages of the fuel pumps 48 and 63 via transfer pump feedback lines 86, 87 and 86, 88 respectively. The pump 71 can be put out of operation by closing a shut-off valve 89 in the end of the line 86 adjacent the pump 71. The pump 72 can be put out of operation by closing a shut-off valve 90 in the end of the line 86 adjacent the pump 72. The line 86 interconnects the nozzles 74 and 76 of the pumps 71 and 72, respectively. The line 87 connects the first stage of the pump 48 into the line 86. The line 87 has a one-way check valve 91 therein adjacent the pump 48. The line 88 connects the first stage of the pump 63 into the line 87 and has a one-way check valve 92 therein adjacent the pump 63. It is preferred that main tank 21 be partitioned and accordingly has a center baffle 93 with three one-way flap valves 94, 95, and 96 therein for permitting fluid from the upper compartment of the tank 21 to pass into the bottom compartment of the tank occupied by an inverted flight fuel intake mechanism 97 attached to the main fuel supply line 40. The fuel tanks 21, 22, 23, and 24 may be defueled through a suitable outlet via the main fuel supply line 40 by opening a shut-off valve 98. In addition to the pressure boost of fuel into the fuel pumps 48 and 63 respectively by the ejector pumps 56, 57 and 62, 69, an ejector pump comprising a nozzle 100 and an eductor 101, is located in the main fuel supply line segment 40b. The nozzle 100 is supplied with fuel under pressure from the first stage of the pump 48 via the line 87, a feedback line 102 having a shut-off valve 103 therein, and a line 104. The intake end of the feedback line 102 is connected into the line 87 between the valve 91 and the pump 48.

The first stage of the pump 63 also supplies fuel under pressure to the nozzle 100 via the line 88, a line 105 having a shut-off valve 106 therein, and the line 104. The intake end of the line 105 is connected into the line 88 between the valve 92 and the pump 63.

The provision of the pump 100, 101 in the fuel line segment 40b boosts the pressure of the fuel to the pumps 48 and 63 with an attendant power saving for driving the same. However, fuel would flow out of line segment 40b via the segment 40a back into the tank 21 and/or the eductor 101 in the line segment 40b if it were not for a one-way check valve 107 in the line segment 40a, FIG. 1. Reverse flow in the line segment 40b is prevented by locating a one-way check valve 108 therein upstream of the ejector pump eductor 101. Should the valves 103 and 106 in the feedback lines 102 and 105 be closed, the pump 100, 101 would be made inoperative. Accordingly, a decreased quantity of fuel would be drawn from the tank 21 via the line segment 40a past the valve 107 than would be the case when the pump 100, 101 is being operated.

It will be understood that when the right hand engine is out of operation, the valve 45 in the line 46 will be closed. Similarly, when the left hand engine is not being operated, the valve 60 in the line 59 will be closed. When the right hand engine's afterburner is not being used, the valve 53 in the line 52 will be closed. Similarly, when the left hand engine's afterburner is not being operated, the valve 66 in the line 65 will be closed.

Closure of the valves 89 and 90 will respectively render inoperative the pumps 71 and 72 in the auxiliary fuel tanks 23 and 24. This means that there will no longer be any fuel forced from the auxiliary tanks 23 and 24 into the main tanks 21 and 22. All fuel transfer must then occur by gravity feed as follows. Fuel in the lower compartment of the tank 21 is continuously replenished from the upper compartment thereof via flap valves 94, 95, and 96, until the upper compartment is empty. Fuel then flows into the lower compartment of the tank 21 from the other main tank 22 via a flap valve 28. Fuel flows into the tank 22 from the auxiliary tank 23 via the flap valve 29. Fuel flows into the tank 23 from the tank 24 via the flap valve 30. A function of the flap valves 28, 29, and 30 is to prevent reverse flow therepast respectively from the tank 21 into the tank 22, from the tank 22 into the tank 23, and from the tank 23 into the tank 24.

If desired, the pump discharge line 64 may be provided with a pressure regulating valve 110 in a pressure relief line 111. The intake end of the line 111 is connected into the line 64 and the discharge end of the line 111 is connected to the second stage inlet of the two stage pump 63.

Figure 2:
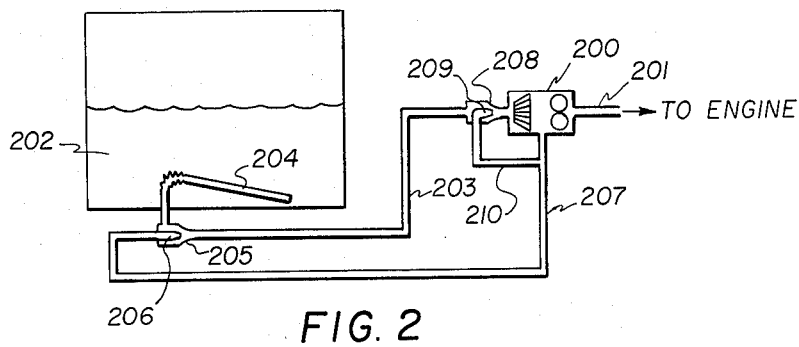

Referring to FIG. 2, a two stage pump 200 has a centrifugal first stage and a constant displacement second stage. The pump 200 discharges fuel via a discharge line 201 to an engine. The pump 200 draws fuel from a fuel tank 202 by way of an intake line 203. The inner end of the intake line 203 has an inverted flight fuel intake mechanism 204, comprising a segment of tubing flexibly connected to the fuel line 203, for assuring that the tip of the mechanism 204 will substantially constantly be submerged in any fuel in the tank 202 regardless of the attitude of the vehicle carrying the engine. Preferably the vehicle in this case is a high performance military aircraft. The pressure in the intake line 203 is increased by an ejector boost pump having an eductor 205 and a nozzle 206 in the line 203. The eductor 205 is connected into the line 203. The nozzle 206 is supplied with fuel under pressure from the first stage of the two stage pump 200 via a main feedback line 207. The pressure in the intake line 203 is further increased by means of a second ejector boost pump comprising an eductor 208 and a nozzle 209, that is also located externally of the fuel tank 202. The eductor 208 is connected into the pump intake line 203 adjacent to the pump 200. The nozzle 209 is supplied with fuel from the feedback line 207 by way of a branch feedback line 210.

Figure 3:
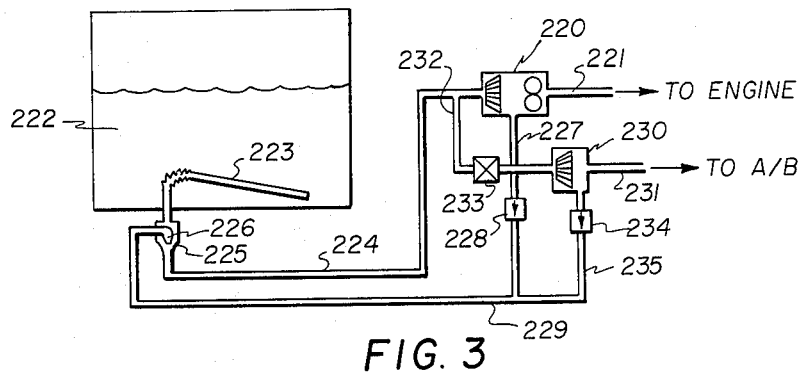

In FIG. 3, a two stage pump 220 has a centrifugal first stage and a constant displacement second stage. The pump 220 discharges via a discharge line 221. The pump 220 draws fuel from a fuel tank 222 through an inverted flight fuel intake mechanism 223 disposed within the tank 222 and via a pump intake line 224. Fluid pressure in the intake line 224 is boosted by means of an ejector boost pump having an eductor 225 and a nozzle 226. The eductor 225 is disposed in the pump intake line 224 externally of the fuel tank 222. The nozzle 226 is supplied with fluid from the first stage of the pump 220 by way of a feedback line 227 having a one-way check valve therein. The check valve 228 prevents flow from the nozzle 226 through the line 227 back into the pump 220. A centrifugal pump 230 discharges fuel through a line 231 to an afterburner of the engine. The centrifugal pump 230 draws fuel from the intake line 224 by way of a second intake line 232 having a shut-off valve 233 therein. Pressure of the fuel fed to the nozzle 226 is increased by bleeding fuel from the pump 230 past a one-way check valve 234 via a line 235 into the feedback line 227 to the nozzle 226.

Figure 4:
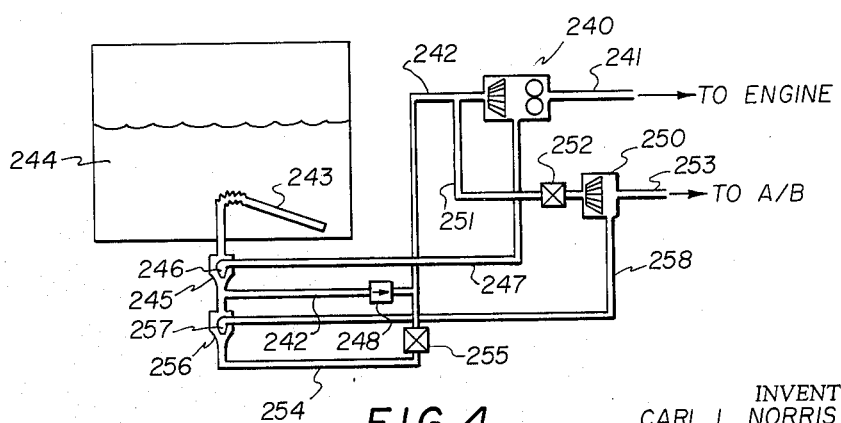

In FIG. 4, a two stage pump 240 has a centrifugal first stage and a constant displacement second stage. The pump 240 discharges via a line 241 to an engine. Fuel is supplied to the pump 240 by way of an intake line 242 connected to an inverted flight fuel intake mechanism 243 that is disposed within a fuel tank 244. Pressure in the intake line 242 is increased by means of an ejector boost pump located externally of the fuel tank 244 and comprising an eductor 245 and a nozzle 246. The eductor 245 is located in the intake line 242 adjacent to the fuel tank 244 but externally thereof. Fuel is supplied to the nozzle 246 from the first stage of the pump 240 by way of a feedback line 247. The intake line 242 has a one-way check valve 248 therein for permitting the passage of fuel from the tank 244 to the pump 240 only.

A centrifugal pump 250 draws fuel from the line 242 adjacent the pump 240 via a line 251 having a shut-off valve 252 therein. The pump 250 discharges to an afterburner of the engine via a line 253. The centrifugal pump 250, when in operation and with the shut-off valve 252 open, feeds fuel back into the line 242 for increasing the fluid pressure therein. In order to accomplish this, a parallel pump intake line or segment 254 is connected across or in parallel with a portion of the pump intake line 242. The line 254 has a shut-off valve 255 therein and an ejector pump comprising an eductor 256 and a nozzle 257. The line 254 is connected across and bypasses the one-way check valve 248 in the line 242. With the shut-off valve 255 in open position, fuel supplied to nozzle 257 via feedback line 258 from the centrifugal pump 250 boosts the fluid pressure in the line 254 and increases the fluid pressure and quantity of fuel supplied to the pump 240 via its intake line 242 in sufficient quantity to supply both the pump 240 and the afterburner pump 250. It is noteworthy that the subsystem of FIG. 4 provides for the discrete operation of the engine and afterburner pumps 240 and 250. When only the afterburner pump 250 is operating or when the fluid pressure in line 254 exceeds that in line 242 ahead of the check valve 248, the check valve 248 will be closed and fluid will flow from the tank 244 through the intake mechanism 243, the line 242, the eductor 245, the bypass line 254, the eductor 256, the shut-off valve 255, back into the intake line 242, line 251, and shut-off valve 252 to the pump 250. It will be noted that pump 240 can still remain in operation even though the check valve 248 is closed.

Figure 5:
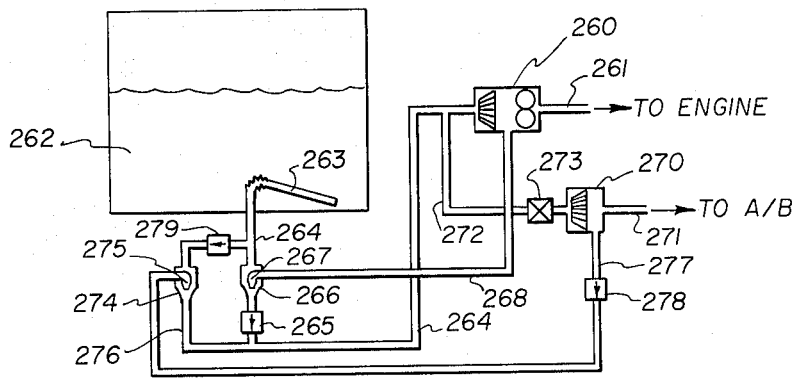

Referring to FIG. 5, a two stage pump 260 has a centrifugal first stage and constant displacement second stage. Pump 260 discharges fuel to an engine through a discharge line 261. The pump 260 draws fuel from a fuel tank 262 through an inverted flight fuel intake mechanism 263 located in the tank 262 and flexibly connected to a fuel pump intake line 264. The fuel pump intake line 264 has a one-way check valve 265 and an ejector pump comprising an eductor 266 and a nozzle 267 therein. The eductor 266 is connected into the line 264 between the valve 265 and the inverted flight mechanism 263. Fluid is supplied to the nozzle 267 via feedback line 268 having its intake end connected to the first stage of the pump 260.

A centrifugal fuel pump 270 supplies fuel via a discharge line 271 to an afterburner of the engine. The pump 270 draws fuel from the fuel pump intake line 264 by way of an intake line 272 having a shut-off valve 273 therein. In order to meet the additional fuel requirements in the main supply line 264 when the afterburner is in operation, an ejector pump comprising an eductor 274 and a nozzle 275 are connected into a bypass line 276 across and in parallel with a segment of the line 264 having the first ejector pump 266, 267 and the check valve 265 therein. The nozzle 275 of the second ejector pump is supplied with fuel from the centrifugal pump 270 via a feedback line 277 having a one-way check valve 278 therein. In order to prevent feedback from the line 264 through the bypass line 276 back towards the inverted flight fuel intake mechanism 263, a one-way check valve 279 is provided in the bypass line 276. When the pressure in the line 264 exceeds the pressure in the line 276, the check valve 279 is open. When the pressure in bypass line 276 is greater than the pressure in the line 264 on the intake side of the check valve 265, the check valve 265 is closed. Similarly, when the pressure in the nozle 275 and the line 277 is greater than the pressure in the line 271 or discharge side of the pump 270, the check valve 278 is closed in order to prevent feedback from the ejector pump nozzle 275 to the pump 270. The centrifugal pump 270 can be put out of operation by simply closing shut-off valve 273 in the line 272. The pumps 260 and 270 can be operated independently of each other since the shutdown or failure of one will not affect the operation of the other.

Figure 6:
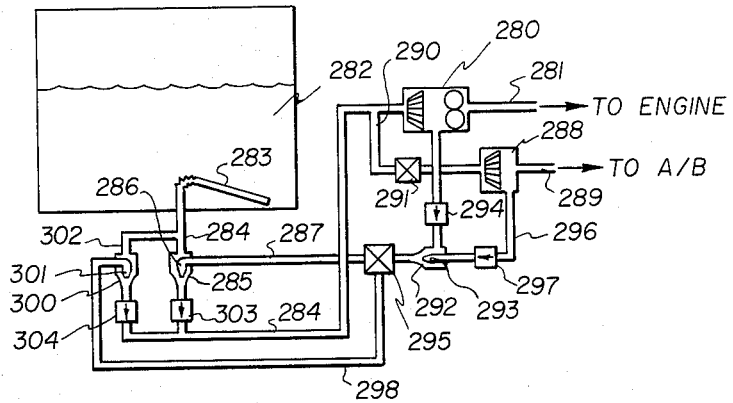

In FIG. 6, a two stage pump 280 has a centrifugal first stage and a constant displacement second stage. The pump 280 discharges fuel to an engine by way of a discharge line 281. The pump 280 draws fuel from a fuel tank 282 via an inverted flight fuel intake mechanism 283 and a fuel pump intake line 284. The mechanism 283 is flexibly connected to the intake line 284. Pressure in the intake line 284 is increased by means of an ejector boost pump comprising an eductor 285 and a nozzle 286 therein. The eductor 285 is connected into the line 284 in close proximity to the tank 282. Fuel is supplied to the nozzle 286 from the first stage of the pump 280 by way of a feedback line 287.

A centrifugal pump 288 discharges fuel to an afterburner of the engine via a discharge line 289. The pump 288 draws fuel from the line 284 by an intake line 290 having a shut-off valve 291 therein. The pump 288 is put in operation only after the shut-off valve 291 is opened. In order to assure an adequate supply of fluid in the main intake line 284 via line 290 to the pump 288, an ejector pump is placed in the feedback line 287 and comprises an eductor 292 and a nozzle 293 therein. The eductor 292 is placed in the feedback line 287 between a one-way check valve 294 and a shut-off valve 295. Fuel is supplied under pressure to the nozzle 293 from the centrifugal pump 288 by way of a feedback line 296 having a one-way check valve 297 therein. When the pressure in the line 296 is greater than the pressure at the nozzle 293, the check valve 297 is open. When the pressure in the first stage of the pump 280 is greater than the fluid pressure in the eductor 292 in the feedback line 287, the check valve 294 is open. Additional quantities of fuel in the fuel pump intake line 284 may be obtained by opening the shut-off valve 295 when the pump 288 is put into operation for permitting fluid under pressure to be bled off from the main feedback line 287 into a branch line 298 for supplying fuel to an ejector boost pump comprising an eductor 300 and a nozzle 301 in a bypass line 302. The nozzle 301 is supplied with fuel from the bypass feedback line 298. The eductor 300 is connected into the bypass line 302. The line 302 is connected across the eductor 285 and a one-way check valve 303 in a segment of the fuel pump intake line 284. The eductor 300 is connected in parallel with the eductor 285. The bypass line 302 is connected in parallel with the segment of the line 284 accommodating the eductor 285 and the check valve 303. A one-way check valve 304 is placed in the line 302. It is possible when both the engine pump 280 and the afterburner pump 288 are in operation that all the valves 291, 294, 297, 295, 303 and 304 are open. However, when the pressure in line 302 exceeds that in line 284, the valve 303 will close. Alternatively, when the pressure in line 284 downstream of the valve 303 is greater than that in line 302, the check valve 304 will close. The shut-off valves 291 and 295 may be simultaneously operated. However, the opening of valve 295 is not necessary for the operation of the pump 288, but may be desired for maximum operating efficiency of the fuel feeding system. Preferably the valve 295 is a three-way valve that can shut off or permit feedback flow to the ejector nozzles 286 and/or 301.

It will be understood that this invention can be modified to adapt it to various circumstances and conditions, and it is accordingly desired to comprehend within the purview of this invention such modifications as may be considered to fall within the scope of the appended claims.

We claim:

1. A fuel feeding system for an aircraft engine comprising, a fuel tank, fuel intake means disposed in said fuel tank, a first pump having first intake line means and first discharge line means, said first pump being located externally of said fuel tank, said first pump intake line means being connected to said fuel intake means, first ejector pump means having first eductor means and first nozzle means, said first ejector pump eductor means being connected into said first pump intake line means externally of said fuel tank, first pressure boost feedback line means connecting said first pump to said first ejector pump nozzle means for boosting the pressure in said first pump intake line means, a second pump having second intake line means and second discharge line means, said second pump being located externally of said fuel tank, said second pump intake line means being connected into said first pump intake line means between said first pump and said first ejector pump means, second pressure boost feedback line means connecting said second pump into said first pressure boost feedback line means, first valve means in said first pressure boost feedback line means between said first pump and said second pressure boost feedback line means for preventing reverse flow into said first pump from said second pressure boost feedback line means, and second valve means in said second pressure boost feedback line means for preventing reverse flow into said second pump from said first pressure boost feedback line means and said valve means being located in such a manner as to permit fuel to be discharged through said discharge line means independently of and parallel to said valve means.

2. A fuel feeding system for an aircraft engine comprising, a fuel tank, fuel intake means disposed in said tank, a first pump having a first intake line, said first pump being located externally of said tank, said first pump intake line being connected to said fuel intake means, first ejector pump means having first nozzle means and first eductor means in said first pump intake line externally of said tank, a first pressure boost feedback line having one end connecting said first pump to said first ejector pump nozzle means for boosting the pressure in said first pump intake line, a transfer tank, second ejector pump means having second eductor means with second nozzle means therein disposed in said transfer tank, a fuel transfer line connected at one end thereof to said second ejector pump eductor means and the other end thereof terminating in said fuel tank, and a second pressure boost feedback line connected at one end thereof into said first pressure boost feedback line and at the other end thereof to said second ejector pump nozzle means.

3. A fuel feeding system for an aircraft engine comprising, a fuel tank, fuel intake means disposed in said tank, a first pump having a first intake line, said first pump being located externally of said tank, said first pump intake line being connected to said fuel intake means, first ejector pump means having first nozzle means and first eductor means in said first pump intake line externally of said tank, a first pressure boost feedback line having one end connecting said first pump to said first ejector pump nozzle means for boosting the pressure in said first pump intake line, said first pump being a two-stage pump and said first feedback line being connected to and drawing fuel from the first stage thereof, a transfer tank, second ejector pump means having second eductor means with second nozzle means therein disposed in said transfer tank, a fuel transfer line connected at one end thereof to said second ejector pump eductor means and the other end thereof terminating in said fuel tank, a second pressure boost feedback line connected at one end thereof into said first pressure boost feedback line and at the other end thereof to said second ejector pump nozzle means, a bypass first pump intake line connected across said first ejector pump means and in parallel therewith, first valve means in said first pump intake line between said bypass first pump intake line and said first ejector pump means and upstream of the latter for preventing feedback into said fuel tank when the pressure in said bypass pump intake line exceeds the pressure in said first ejector pump eductor means, and second valve means in said bypass pump intake line for preventing reverse flow therein when the pressure therein is less than in said first ejector pump eductor means.

4. A fuel feeding system as set forth in claim 3, further comprising, third ejector pump means having third eductor means with third nozzle means therein, said third ejector pump eductor means being connected into said first pump intake line adjacent said first pump, and a third pressure boost feedback line having one end connected to said third ejector pump nozzle means and another end connected to the second stage of said first pump for supplying fuel under pressure to said third ejector pump nozzle means.

5. A fuel feeding system as set forth in claim 4, further comprising, a pressure relief feedback line having one end connected to the second stage of said first pump upstream of said third pressure boost feedback line and having another end connected to the first stage of said first pump, and a pressure relief valve in said pressure relief feedback line for regulating the output pressure of the second stage of said first pump back to said first stage of said first pump via said third pressure boost feedback line.

6. A fuel feeding system as set forth in claim 4, further comprising, a second pump having an intake line connected into said first pump intake line between said first pump and said third ejector pump means.

7. A fuel feeding system for an aircraft engine comprising, a fuel tank, fuel intake means disposed in said tank, a first pump having a first intake line and located externally of said tank, said first pump intake line being connected to said fuel intake means, first eductor pump means having first eductor means with first nozzle means therein connected into said first pump intake line, a first pressure boost feedback line having one end connecting said first pump to said first ejector pump nozzle means for boosting the pressure in said first pump intake line, a bypass first pump intake line connected across and in parallel with a portion of said first pump intake line between said first ejector pump means and said first pump, a second pump having a second intake line connected to said first pump intake line between said first pump and said first ejector pump means, second ejector pump means having second eductor means with second nozzle means therein and connected into said bypass first pump intake line, a second pressure boost feedback line connected at one end thereof to said second pump and at the other end thereof to said second ejector pump nozzle means, first valve means in said first pump intake line parallel to and across said bypass first pump intake line, second valve means in said second pump intake line, and third valve means in said bypass pump intake line.

8. A fuel feeding system as set forth in claim 7, wherein said first valve means is a one-way check valve for preventing reverse flow therepast when the pressure in said bypass first pump intake line is greater than the pressure in said first pump intake line between said first valve means and said first ejector pump means and when said second and third valve means are open, and said second and third valve means being closed when said second pump is not being operated.

9. A fuel feeding system for an aircraft engine comprising, a fuel tank, fuel intake means disposed in said tank, a first pump having a first intake line and located externally of said tank, said first pump intake line being connected to said fuel intake means, first eductor pump means having first eductor means with first nozzle means therein connected into said first pump intake line, a first pressure boost feedback line having one end connecting said first pump to said first ejector pump nozzle means for boosting the pressure in said first pump intake line, a bypass first pump intake line connected across and in parallel with a portion of said first pump intake line across said first ejector pump means and between said fuel intake means and said first pump, second ejector pump means having second eductor means with second nozzle means therein disposed in said bypass first pump intake line, a second pump having a second intake line connected to said first pump intake line between said first pump and said first ejector pump means, a second pressure boost feedback line connected at one end thereof to said second pump and at the other end thereof to said second ejector pump nozzle means, first valve means in said first pump intake line parallel to and across said bypass first pump intake line, second valve means in said second pump intake line, and third valve means in said bypass pump intake line.

10. A fuel feeding system as set forth in claim 9, wherein said first valve means is a one-way check valve for preventing reverse flow therepast when the pressure in said bypass first pump intake line is greater than the pressure in said first pump intake line between said first valve means and said first ejector pump means and when said second and third valve means are open, said second and third valve means being closed when said second pump is not being operated.

11. A fuel feeding system as set forth in claim 10, further comprising, fourth valve means in said bypass first pump intake line upstream of said second ejector pump means for preventing reverse flow of fuel therepast into the portion of said first pump intake line upstream of said first ejector pump means.

12. A fuel feeding system for an aircraft engine comprising, a fuel tank, fuel intake means disposed in said fuel tank, a first pump having first intake line means, said first pump being located externally of said fuel tank, said first pump intake line means being connected to said fuel intake means, first ejector pump means having first eductor means and first nozzle means, said first ejector pump eductor means being connected into said first pump intake line means externally of said fuel tank, first pressure boost feedback line means connecting said first pump to said first ejector pump nozzle means for boosting the pressure in said first pump intake line means, a second pump having second intake line means, said second pump being located externally of said fuel tank, said second pump intake line means being connected into said first pump intake line means between said first pump and said first ejector pump means, second pressure boost feedback line means connecting said second pump into said first pressure boost feedback line means, first valve means in said first pressure boost feedback line means between said first pump and said second pressure boost feedback line means for preventing reverse flow into said first pump from said second pressure boost feedback line means, second valve means in said second pressure boost feedback line means for preventing reverse flow into said second pump from said first pressure boost feedback line means, and second ejector pump means comprising second eductor means having second nozzle means therein, said second ejector pump eductor means being connected into said first pressure boost feedback line means downstream of said first valve means, and said second pressure boost feedback line means being connected to said second ejector pump nozzle means.

13. A fuel feeding system for an aircraft engine comprising, a fuel tank, fuel intake means disposed in said fuel tank, a first pump having first intake line means, said first pump being located externally of said fuel tank, said first pump intake line means being connected to said fuel intake means, first ejector pump means having first eductor means and first nozzle means, said first ejector pump eductor means being connected into said first pump intake line means externally of said fuel tank, first pressure boost feedback line means connecting said first pump to said first ejector pump nozzle means for boosting the pressure in said first pump intake line means, a second pump having a second intake line means, said second pump being located externally of said fuel tank, said second pump intake line means being connected into said first pump intake line means between said first pump and said first ejector pump means, second pressure boost feedback line means connecting said second pump into said first pressure boost feedback line means, first valve means in said first pressure boost feedback line means between said first pump and said second pressure boost feedback line means for preventing reverse flow into said first pump from said second pressure boost feedback line means, second valve means in said second pressure boost feedback line means for preventing reverse flow into said second pump from said first pressure boost feedback line means, third valve means in said second pump intake line means for shutting off the supply of fuel to said second pump, fourth valve means in said first pump intake line means between said second pump intake line means and said first ejector pump means for preventing reverse flow therein, bypass intake line means connected to said first intake line means across and in parallel with said first ejector pump means and said fourth valve means, second ejector pump means comprising second eductor means having a second nozzle means therein, said second ejector pump eductor means being connected into said bypass intake line means, third pressure boost feedback line means having one end connected into said first pressure feedback line means downstream of said first valve means and having the other end connected to said second ejector pump nozzle means, and fifth valve means connected into said bypass intake line means downstream of said second ejector pump means for preventing reverse flow therein.

References Cited by the Examiner
UNITED STATES PATENTS

| | | | |
|---|---|---|---|
| 1,350,095 | 8/1920 | Eddison | 103—42 |
| 1,930,064 | 10/1933 | Schmidt | 103—262 |
| 2,183,351 | 12/1939 | Harris | 103—5 |
| 2,812,715 | 11/1957 | Redding et al. | 103—5 |
| 2,823,613 | 2/1958 | Leduc | 103—5 |
| 3,043,104 | 7/1962 | Magnus | 103—5 |

MARK NEWMAN, *Primary Examiner.*

W. J. KRAUSS, *Assistant Examiner.*